(12) United States Patent
Kato

(10) Patent No.: US 12,413,871 B2
(45) Date of Patent: Sep. 9, 2025

(54) IMAGING DEVICE

(71) Applicant: HITACHI KOKUSAI ELECTRIC INC., Tokyo (JP)

(72) Inventor: Sho Kato, Tokyo (JP)

(73) Assignee: KOKUSAI DENKI Electric Inc., Tokyo (JP)

( * ) Notice: Subject to any disclaimer, the term of this patent is extended or adjusted under 35 U.S.C. 154(b) by 272 days.

(21) Appl. No.: 18/021,013

(22) PCT Filed: Sep. 24, 2020

(86) PCT No.: PCT/JP2020/036085
§ 371 (c)(1),
(2) Date: Feb. 13, 2023

(87) PCT Pub. No.: WO2022/064609
PCT Pub. Date: Mar. 31, 2022

(65) Prior Publication Data
US 2023/0300482 A1    Sep. 21, 2023

(51) Int. Cl.
*H04N 25/67* (2023.01)
*H04N 25/677* (2023.01)
*H04N 25/76* (2023.01)

(52) U.S. Cl.
CPC ........... *H04N 25/677* (2023.01); *H04N 25/67* (2023.01); *H04N 25/76* (2023.01)

(58) Field of Classification Search
CPC .............................. H04N 25/677; H04N 25/76
See application file for complete search history.

(56) References Cited

U.S. PATENT DOCUMENTS

| | | |
|---|---|---|
| 8,355,063 B2 | 1/2013 | van Beek |
| 8,355,064 B2 | 1/2013 | van Beek |
| 9,118,873 B2 | 8/2015 | Marumoto et al. |
| 10,284,796 B2 | 5/2019 | Ise |

(Continued)

FOREIGN PATENT DOCUMENTS

| | | | |
|---|---|---|---|
| JP | 2011-109580 A | 6/2011 |
| JP | 2012-235442 A | 11/2012 |

(Continued)

OTHER PUBLICATIONS

International Search Report dated Nov. 17, 2020.

*Primary Examiner* — Lin Ye
*Assistant Examiner* — Fayez A Bhuiyan
(74) *Attorney, Agent, or Firm* — BACON & THOMAS, PLLC

(57) ABSTRACT

An imaging device using a CMOS imaging element includes a memory that stores, as a correction reference value, a gain exceeding a gain obtained by the imaging element and at which a linear fixed pattern noise starts to occur in a captured image; and an image processor that suppresses the fixed pattern noise when the gain exceeding the gain obtained by the imaging element exceeds the correction reference value. The captured image includes multiple pixel lines, each pixel in each of the pixel lines being arranged according to one of a plurality of color scheme patterns. The image processor suppresses the fixed pattern noise when a pixel line of the fixed pattern noise is not continuous in the same color scheme pattern, or when the pixel lines of the fixed pattern noise are continuous in the same color scheme pattern and the number of continuous lines is two.

5 Claims, 4 Drawing Sheets

(56) References Cited

U.S. PATENT DOCUMENTS

| | | | |
|---|---|---|---|
| 10,368,041 B2 | 7/2019 | Iwakura et al. | |
| 2012/0075506 A1* | 3/2012 | van Beek | G06T 5/70 |
| | | | 348/241 |

FOREIGN PATENT DOCUMENTS

| | | |
|---|---|---|
| JP | 2012-235443 A | 11/2012 |
| JP | 2015-076701 A | 4/2015 |
| JP | 2017-157999 A | 9/2017 |
| JP | 2017-200140 A | 11/2017 |

* cited by examiner

IMAGING DEVICE

TECHNICAL FIELD

The present disclosure relates to an imaging device that uses a CMOS imaging element for imaging.

BACKGROUND

In recent years, with the increase in the number of pixels and speed of imaging elements, the imaging elements used in most cameras on the market have been replaced from charge coupled devices (CCD) to complementary metal oxide semiconductors (CMOS). The reasons for this are the above-described increase in the number of pixels and speed, and low power consumption. Further, technology has been improved to remove elements that affect image quality, such as fixed pattern noise (FPN) and random noise, which had been a problem with CMOS until then. This technological improvement was an important turning point in the switch from CCD to CMOS.

At present, although the increase in the number of pixels and the sensitivity of CMOS is progressing more and more, and more diverse needs are emerging, the price of CMOS imaging elements is also rising in proportion to this. Therefore, for reducing the device cost, in order to obtain a gain (sensitivity gain) that exceeds the specifications of the imaging element using a CMOS imaging element for general industrial or surveillance purposes, for example, by a field programmable gate array (FPGA) or an image signal processor (ISP), an attempt is made to additionally increase sensitivity in addition to noise reduction processing.

Various inventions have been proposed for noise correction of an output image from an imaging element. For example, Patent Document 1 discloses a technique for specifying a position where a linear fixed pattern noise is generated and correcting each pixel that constitutes the fixed pattern noise based on neighboring pixels of the same color.

PRIOR ART DOCUMENTS

Patent Documents

Patent Document 1: Japanese Laid-open Patent Publication No. 2011-109580

SUMMARY

Problems to Be Resolved by the Invention

If the above processing is performed to obtain a gain that exceeds the specifications of the CMOS imaging element, fixed pattern noise which was not conspicuous within the specifications of the CMOS imaging element becomes conspicuous due to individual differences in the CMOS imaging elements.

The present disclosure has been made in view of the conventional circumstances as described above, and the object of the present disclosure is to provide an imaging device capable of suppressing fixed pattern noise that occurs due to individual differences in CMOS imaging elements when providing a gain that exceeds the specifications of the CMOS imaging element.

Means for Solving the Problems

In order to achieve the above object, in the present disclosure, the imaging device was configured as follows.

That is, an imaging device using a CMOS imaging element for imaging, comprises: a memory configured to store, as a correction reference value, a gain exceeding a gain obtained by the CMOS imaging element and at which a linear fixed pattern noise starts to occur in a captured image; and an image processor configured to perform processing for suppressing the fixed pattern noise on the captured image when a gain when providing the gain exceeding the gain obtained by the CMOS imaging element exceeds the correction reference value.

Here, the captured image may include a plurality of pixel lines, each pixel in each of the plurality of pixel lines may be arranged according to one of a plurality of color scheme patterns, and the image processor may perform processing for suppressing the fixed pattern noise on the capture image when a pixel line of the fixed pattern noise is not continuous in the same color scheme pattern, or when the pixel lines of the fixed pattern noise are continuous in the same color scheme pattern and the number of continuous lines is two.

At this time, when the pixel line of the fixed pattern noise is not continuous in the same color scheme pattern, the image processor may correct each pixel in the pixel line of the fixed pattern noise based on the same color pixels in the pixel lines having the same color scheme pattern on both sides of the pixel line.

In addition, when the pixel lines of the fixed pattern noise are continuous in the same color pattern and the number of continuous lines is two, the image processor may correct each pixel in a left pixel line of the two pixel lines based on the same color pixel in the pixel line having the same color scheme pattern on a left side of the pixel line, and correct each pixel in a right pixel line of the two pixel lines based on the same color pixel in the pixel line having the same color scheme pattern on a right side of the pixel line.

In addition, the image processor may correct each pixel in the pixel line of the fixed pattern noise based on the same color pixels at the same positions in the pixel line having the same color scheme pattern.

Effect of the Invention

In accordance with the present disclosure, it is possible to provide an imaging device capable of suppressing fixed pattern noise that occurs due to individual differences in CMOS imaging elements when providing a gain that exceeds the specifications of the CMOS imaging element.

DETAILED DESCRIPTION

The imaging device according to the present disclosure uses a CMOS imaging element for imaging, and has a gain adding function for adding a gain by FPGA or ISP so as to obtain a gain that exceeds a gain (sensitivity gain) obtained inside the CMOS imaging element. Further, the imaging device according to the present disclosure has a fixed pattern noise (FPN) suppression function for suppressing FPN that occurs in a captured image when a gain is added. The imaging device according to an embodiment of the present disclosure will be described below with a focus on the FPN suppression function.

Figure 1:
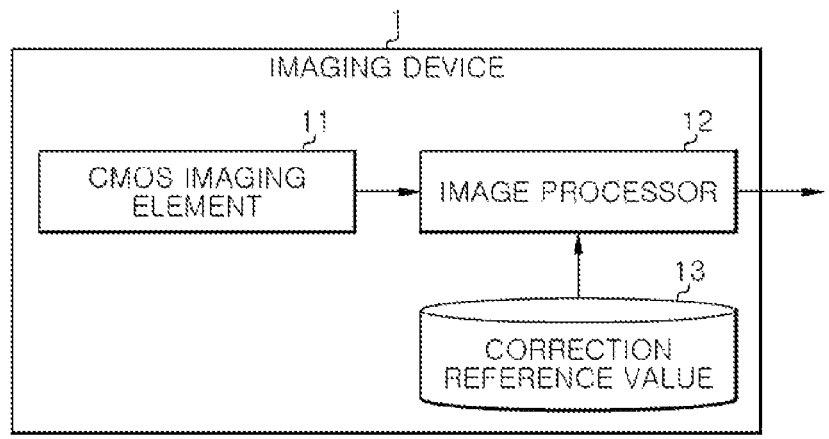
FIG. 1 is a diagram showing a configuration example of an imaging device according to one embodiment of the present disclosure.

FIG. 1 shows a configuration example of an imaging device according to one embodiment of the present disclosure. The imaging device 1 of this example includes a CMOS imaging element 11, an image processor 12, and a memory 13. The memory 13 stores in advance, as a correction reference value, a gain exceeding a gain obtained by the CMOS imaging element 11 and at which a linear fixed pattern noise starts to occur in a captured image. This correction reference value is set according to the result of measurement in advance, and may differ depending on the individual difference of the CMOS imaging element 11. In the case that the gain when providing the gain that exceeds the gain obtained by the CMOS imaging element 11 exceeds the correction reference value, the image processor 12 automatically performs line correction for suppressing fixed pattern noise (FPN) on the captured image after gain adjustment.

First, how to set the correction reference value will be explained. In the case of using a CMOS imaging element for imaging, if the gain is adjusted to be added by FPGA or ISP beyond the gain obtained inside the CMOS imaging element, some FPNs may be conspicuous depending on the characteristics (individual differences) of the CMOS imaging element. Therefore, as pre-processing, the gain at which the FPN starts to occur is specified while gradually adding the gain to the upper limit gain obtained by the CMOS imaging element 11, and the gain at which FPN occurs is stored as the correction reference value in the memory 13.

Figure 2:
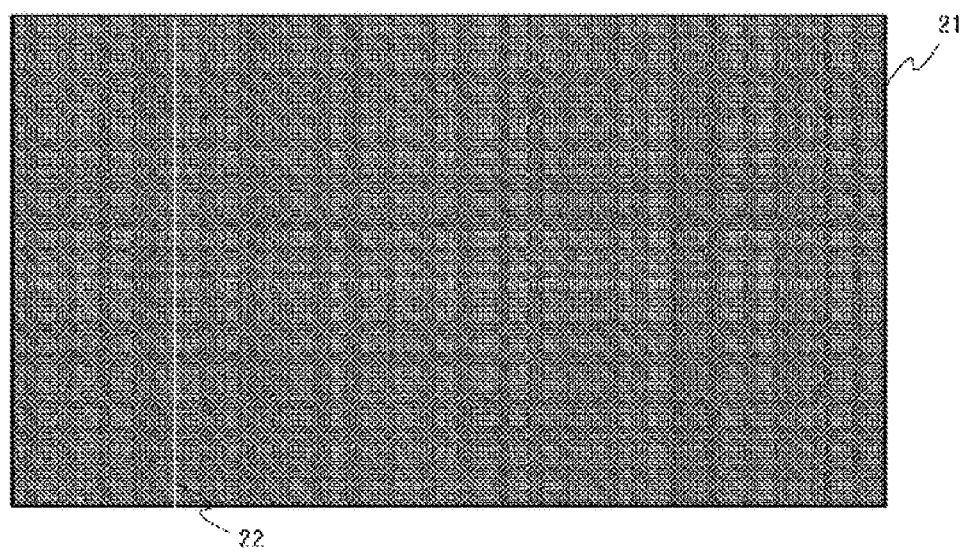
FIG. 2 is a diagram showing an example of fixed pattern noise included in a captured image.
Figure 3:
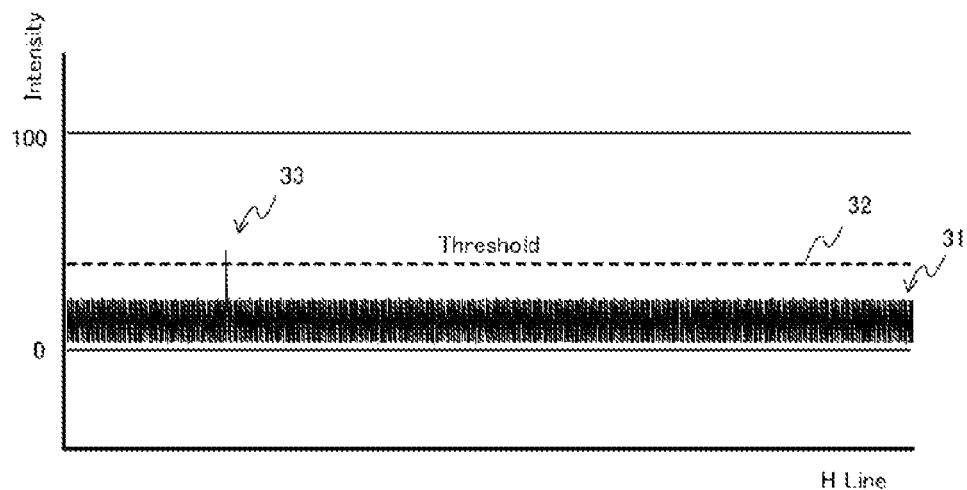
FIG. 3 is a diagram showing an example of a video level waveform of a captured image containing fixed pattern noise.

FIG. 2 shows an example of FPN contained in a captured image after gain addition. In the example of FIG. 2, a linear FPN 22 extending in the vertical direction occurs in a part of a captured image 21. FIG. 3 shows an example of a video level waveform of a captured image containing FPN. In FIG. 3, the horizontal axis (H Line) indicates a horizontal position (line position) of a captured image, and the vertical axis (Intensity) indicates a video level (numerical value in the range of 0 to 100) of a pixel line at that horizontal position. In the example of FIG. 3, a peak 33 where a video level waveform 31 exceeds a threshold 32 occurs at the line position corresponding to the FPN 22 in FIG. 2. Therefore, what dB the gain is when the peak 33 is detected is automatically or manually detected, and the gain (dB) at the time of detection is set as the correction reference value in the memory 13.

Next, line correction (FPN suppression function) provided during operation of the imaging device 1 will be explained. Since the line correction in this example aims to correct only FPN that exceeds a threshold as a product, ON and OFF are automatically switched in conjunction with the gain provided by the imaging device 1. In other words, the line correction becomes ON when the gain provided by the imaging device 1 exceeds the correction reference value, and the line correction becomes OFF when the gain provided by the imaging device 1 does not exceed the correction reference value.

Figure 4:
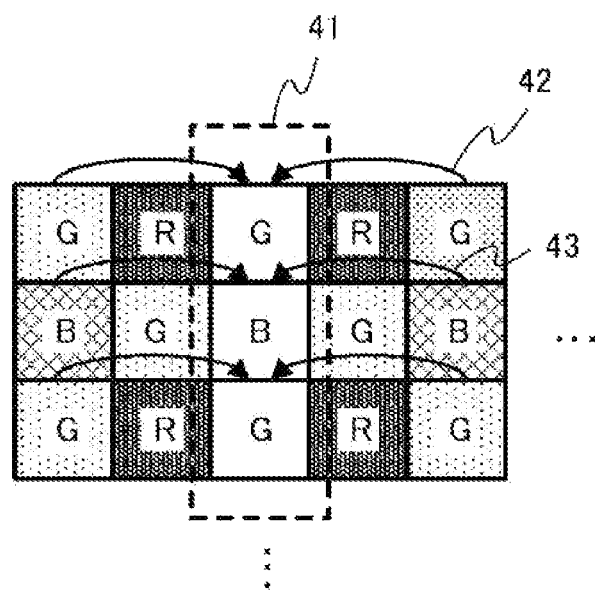
FIG. 4 is a diagram showing an example of correction when fixed pattern noise is not continuous in the same color arrangement.
Figure 5:
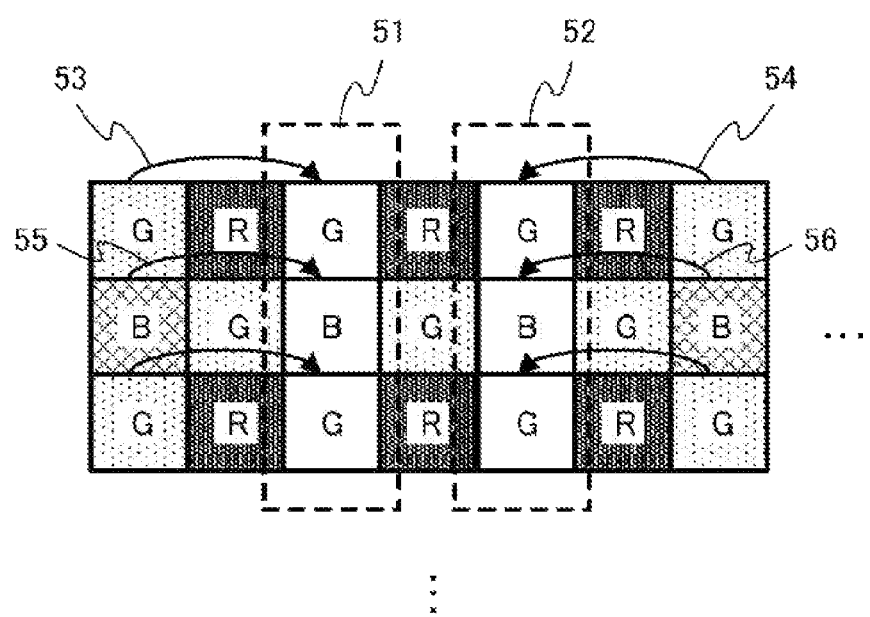
FIG. 5 is a diagram showing an example of correction when two lines of fixed pattern noise are continuous in the same color arrangement.

FIG. 4 shows an example of line correction when FPN is not continuous in the same color arrangement. FIG. 5 shows an example of line correction when two lines of FPN are continuous in the same color arrangement. As shown in FIGS. 4 and 5, a captured image is composed of a plurality of pixel lines extending in the vertical direction. In each of the plurality of pixel lines, each pixel in the pixel line is arranged according to one of a plurality of color scheme patterns. In the examples of FIGS. 4 and 5, there are a first color scheme pattern in which green (G) and blue (B) are alternately arranged, and a second color scheme pattern in which red (R) and green (G) are alternately arranged. The captured image is configured by alternately arranging the pixel lines of the first color scheme pattern and the pixel lines of the second color scheme pattern.

When the pixel line of the FPN is not continuous in the same color scheme pattern, or when the pixel lines of the FPN are continuous in the same color scheme pattern and the number of continuous lines is two, the image processor 12 performs processing for suppressing FPN on the captured image. When three or more lines of the FPN are continuous in the same color arrangement, the CMOS imaging element 11 is replaced as a defective product without being subjected to line correction because the effect on the image is large.

When the pixel line of the FPN is not continuous in the same color scheme pattern, as shown in FIG. 4, each pixel of a pixel line 41 of the FPN is corrected based on the same color pixels of the pixel lines having the same color scheme pattern on both sides of the pixel line. In other words, as indicated by reference numerals 42 and 43, each pixel in the pixel line 41 is corrected with a value (i.e., average value) obtained by adding values of the same color pixels at the same positions in the left and right pixel lines having the same color scheme pattern and dividing the result by 2.

When the pixel lines of the FPN are continuous in the same color scheme pattern and the number of continuous lines is two, as shown in FIG. 5, each pixel in a left pixel line 51 of the two pixel lines is corrected based on the same color pixel of the pixel line having the same color scheme pattern on the left side of the pixel line. In other words, as indicated by reference numerals 53 and 55, each pixel in the pixel line 51 is corrected with the value of each pixel at the same position in the pixel line having the same color scheme pattern on the left side. Further, each pixel in a right pixel line 52 of the two pixel lines is corrected based on the same color pixel of the pixel line having the same color scheme pattern on the right side of the pixel line. In other words, as indicated by reference numerals 54 and 56, each pixel in the pixel line 52 is corrected with the value of the same color pixel at the same position in the pixel line having the same color scheme pattern on the right side.

Figure 6:
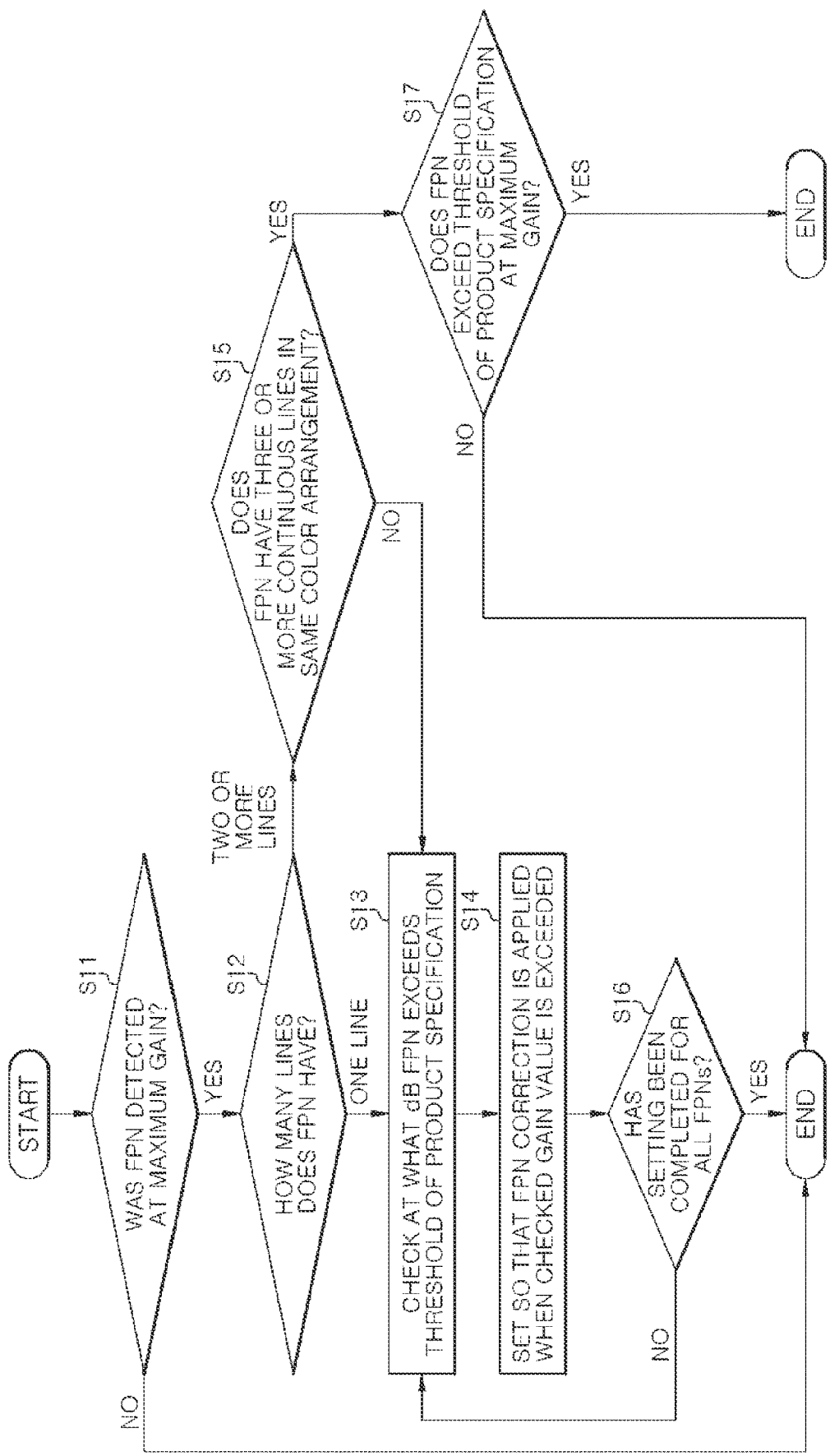
FIG. 6 is a diagram showing an example of a flowchart relating to pre-processing for correcting fixed pattern noise.

FIG. 6 shows an example of a flowchart relating to pre-processing for correcting FPN.

In the pre-processing, first, the imaging device is put in a light-shielding (lens closed) state, and the gain is increased to the maximum to check whether the FPN is detected (step S11). If the FPN is not detected, the processing is ended. On the other hand, when the FPN is detected, the number of lines of the FPN is detected automatically or manually (step S12).

When the number of lines of the FPN is one, the gain is gradually increased from the gain obtained according to the specifications of the CMOS imaging element, and it is checked at what dB the gain causes the peak 33 of waveform of the FPN exceeds the threshold 32 (step S13). Then, the checked gain is set as the correction reference value, and the line correction is automatically performed on the corresponding line of the FPN when the gain during operation exceeds the correction reference value (step S14).

When the number of lines of the FPN is two or more, it is checked whether three or more lines of the FPN are continuous in the same color arrangement (step S15). If three or more lines of the FPN are not continuous in the same color arrangement, that is, if the FPN remains in two continuous lines in the same color arrangement, the same processing as in the case where the number of lines of the FPN is one is performed. In other words, the gain is gradually increased from the gain obtained according to the specifications of the CMOS imaging element, and it is checked at what dB the gain causes the peak 33 of waveform of the FPN exceeds the threshold 32 (step S13). Then, the checked gain is set as the correction reference value, and the line correction is automatically performed on the corresponding line of the FPN when the gain during operation exceeds the correction reference value (step S14).

The above processing is repeated for all of the FPN that is not continuous in the same color arrangement and the FPNs of two continuous lines in the same color arrangement (step S15). When FPN occurs at a plurality of positions in a captured image, since the gain at which FPN starts to occur differs for each FPN, the correction reference value is set for each line of the FPN.

When three or more lines of the FPN are continuous in the same color arrangement, it is checked whether the FPN at the maximum gain exceeds a threshold of the product specifications (step S17). If the FPN at the maximum gain does not exceed the threshold of the product specifications, it is determined that no correction is necessary, and the processing is ended. On the other hand, when the FPN at the maximum gain exceeds the threshold of the product specifications, it is determined as a defective product, and the above processing is performed again after replacing the CMOS imaging element.

As described above, the imaging device 1 in this example includes the CMOS imaging element 11, the memory 13 that stores, as the correction reference value, the gain exceeding the gain obtained by the CMOS imaging element 11 and at which linear FPN starts to occur in the captured image, and the image processor 12 for performing line correction for suppressing FPN on the captured image when the gain when providing the gain exceeding the gain obtained by the CMOS imaging element 11 exceeds the correction reference value.

In accordance with such a configuration, when the gain during operation exceeds the correction reference value, since the line correction is automatically performed on the captured image, it is possible to suppress fixed pattern noise that occurs due to individual differences in the CMOS imaging elements. Therefore, the FPN that occurs at a specific gain or more can be made inconspicuous. As a result, since it is possible not only to achieve high sensitivity of the imaging device by using the CMOS imaging element used for general industrial or surveillance purposes, but also to improve the yield of the CMOS imaging element, a high-sensitivity imaging device can be produced more stably.

In this example, each pixel of the FPN is corrected based on the same color pixels at the same positions in the pixel lines on both sides of the FPN, but the same color pixels at other positions (upper and lower neighboring positions) in the pixel lines on both sides of the FPN may also be taken into account for correction. Further, each pixel of the FPN may be corrected by considering not only the pixels in the pixel line separated from the FPN by one line but also the pixels in the pixel line separated from the FPN by two lines.

Although the present disclosure has been described above based on one embodiment, it goes without saying that the present disclosure is not limited to the configurations described herein, and can be widely applied to apparatuses and systems having other configurations.

The present disclosure can also be provided as, e.g., a method including technical procedures related to the above processing, a program for causing a processor to execute the above processing, a storage medium storing such a program in a computer-readable manner, or the like.

The scope of the present disclosure is not limited to the illustrated and described exemplary embodiments, but also includes all embodiments that provide effects equivalent to those intended by the present disclosure. Moreover, the scope of the present disclosure may be defined by any desired combination of specific features of each and every disclosed features.

INDUSTRIAL APPLICABILITY

The present disclosure can be used for an imaging device that uses a CMOS imaging element for imaging.

DESCRIPTION OF REFERENCE NUMERALS

1: imaging device, 11: CMOS imaging element, 12: image processor, 13: memory

The invention claimed is:

1. An imaging device using a CMOS imaging element for imaging, comprising:
   a memory configured to store, as a correction reference value, a gain exceeding a gain obtained by the CMOS imaging element and at which a linear fixed pattern noise starts to occur in a captured image; and
   an image processor configured to perform processing for suppressing the fixed pattern noise on the captured image when a gain when providing the gain exceeding the gain obtained by the CMOS imaging element exceeds the correction reference value,
   wherein the captured image includes a plurality of pixel lines,
   each pixel in each of the plurality of pixel lines is arranged according to one of a plurality of color scheme patterns, and
   the image processor performs processing for suppressing the fixed pattern noise on the capture image when a pixel line of the fixed pattern noise is not continuous in the same color scheme pattern, or when the pixel lines of the fixed pattern noise are continuous in the same color scheme pattern and the number of continuous lines is two.

2. The imaging device of claim 1, wherein when the pixel line of the fixed pattern noise is not continuous in the same color scheme pattern, the image processor corrects each pixel in the pixel line of the fixed pattern noise based on the same color pixels in the pixel lines having the same color scheme pattern on both sides of the pixel line.

3. The imaging device of claim 1, wherein when the pixel lines of the fixed pattern noise are continuous in the same color pattern and the number of continuous lines is two, the image processor corrects each pixel in a left pixel line of the two pixel lines based on the same color pixel in the pixel line having the same color scheme pattern on a left side of the pixel line, and corrects each pixel in a right pixel line of the two pixel lines based on the same color pixel in the pixel line having the same color scheme pattern on a right side of the pixel line.

4. The imaging device of claim 2, wherein the image processor corrects each pixel in the pixel line of the fixed pattern noise based on the same color pixels at the same positions in the pixel line having the same color scheme pattern.

5. The imaging device of claim 3, wherein the image processor corrects each pixel in the pixel line of the fixed pattern noise based on the same color pixels at the same positions in the pixel line having the same color scheme pattern.

* * * * *